(12) United States Patent
Ferguson

(10) Patent No.: US 9,559,749 B2
(45) Date of Patent: Jan. 31, 2017

(54) SYSTEM AND METHOD OF ENCODING DATA IN A PREAMBLE PATTERN

(75) Inventor: Helaman David Pratt Ferguson, Orem, UT (US)

(73) Assignee: Digi International Inc., Minnetonka, MN (US)

(*) Notice: Subject to any disclaimer, the term of this patent is extended or adjusted under 35 U.S.C. 154(b) by 659 days.

(21) Appl. No.: 13/238,519

(22) Filed: Sep. 21, 2011

(65) Prior Publication Data
US 2013/0070864 A1    Mar. 21, 2013

(51) Int. Cl.
*H04K 1/10* (2006.01)
*H04L 27/28* (2006.01)
*H04B 1/713* (2011.01)

(52) U.S. Cl.
CPC .................. *H04B 1/713* (2013.01)

(58) Field of Classification Search
CPC ....................................... H04B 1/713
USPC ......... 375/260, 132–136, 361; 370/208, 209, 370/474
See application file for complete search history.

(56) References Cited

U.S. PATENT DOCUMENTS 5,471,503 A * 11/1995 Altmaier et al. ............. 375/133
6,018,555 A *  1/2000 Mahany ....................... 375/347
8,437,439 B2 * 5/2013 Kato et al. ................... 375/361

* cited by examiner

*Primary Examiner* — Phuong Phu
(74) *Attorney, Agent, or Firm* — Fogg & Powers LLC

(57) ABSTRACT

Systems and methods for encoding information in a preamble used in a frequency agile radio network are disclosed. In one example, a method comprises creating a plurality of preamble patterns, wherein each preamble includes an N bit header and M bit body, wherein N and M are integers greater than two. The method further comprises identifying the preamble patterns that have headers with a bit pattern that cannot occur in the body, wherein the preamble has a run length no greater than P bits, wherein P is an integer greater than one.

16 Claims, 4 Drawing Sheets

401 Preambles:

0 1 0 0 1   X X   0 1   X X   0 1   X X   0 1   X X
1 0 1 1 0   X X   1 0   X X   1 0   X X   1 0   X X

402

403 Table 0 1 0 0 1   X X   0 1   X X   0 1   X X   0 1   X X   0 1
1 0 1 0 0   1 X   X 0   1 X   X 0   1 X   X 0   1 X   X 0
0 1 0 1 0   0 1   X X   0 1   X X   0 1   X X   0 1   X X
⋮

FIG. 4

SYSTEM AND METHOD OF ENCODING DATA IN A PREAMBLE PATTERN

FIELD

The invention relates generally to wireless communication signals, and more specifically to a system and method for encoding data in a preamble pattern.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

Many of today's computers, cellular telephones, and other such devices rely on wireless communication to exchange information with other devices, such as to surf the Internet, send and receive email, and communicate audio and video. Still other devices wirelessly communicate with one another to exchange information such as to manage a fleet of vehicles or other assets, to monitor security information or utility usage in a building, or to control industrial systems.

One such wireless example is the Bluetooth technology that enables a cell phone user to associate and use an earpiece in what is sometimes referred to a personal area network or PAN. Another example is a mesh network, in which a number of devices work together to form a mesh, such that data can be sent from a source device to a destination device via other devices in the mesh network.

In certain radio protocols, a 10-bit preamble is created and repeatedly transmitted enough times for a receiving radio to see the preamble when it is scanning for a transmission. The data encoding format might be, for example, Manchester encoding or Biphase space encoding.

In one approach, the preamble includes a hopping pattern and a channel number. Typically, the hopping number is less than 10; it uniquely identifies radios that can see each other. That is, if two radios have different hopping patterns, they cannot see each other. The channel number is the physical channel number of the channel the transmission is sent on.

The receiving radio, when tuned to a particular channel, knows the pattern that it is looking for. If it does not find this pattern, then it moves on to the next channel. To determine if the channel data is valid, one looks at bit timing, valid "Manchester" encoding, and, eventually, the full preamble pattern itself. If any of these tests fail, the radio switches to the next channel.

Once a radio is "locked" into the preamble, then it will continue listening on the channel, until the full packet is received.

BRIEF DESCRIPTION OF THE FIGURES

FIG. 4 shows example preambles and a preamble table, consistent with an example embodiment of the invention.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

As noted above, once a radio is "locked" into the preamble, then it will continue listening on the channel, until the full packet is received, even if the packet is not intended for that radio. This has the disadvantage in that the radio could miss a transmission on another channel that is intended for that radio. It would be advantageous to be able to recognize that a packet is not intended for the radio receiving the packet so that the radio can move on to another channel.

Figure 1:
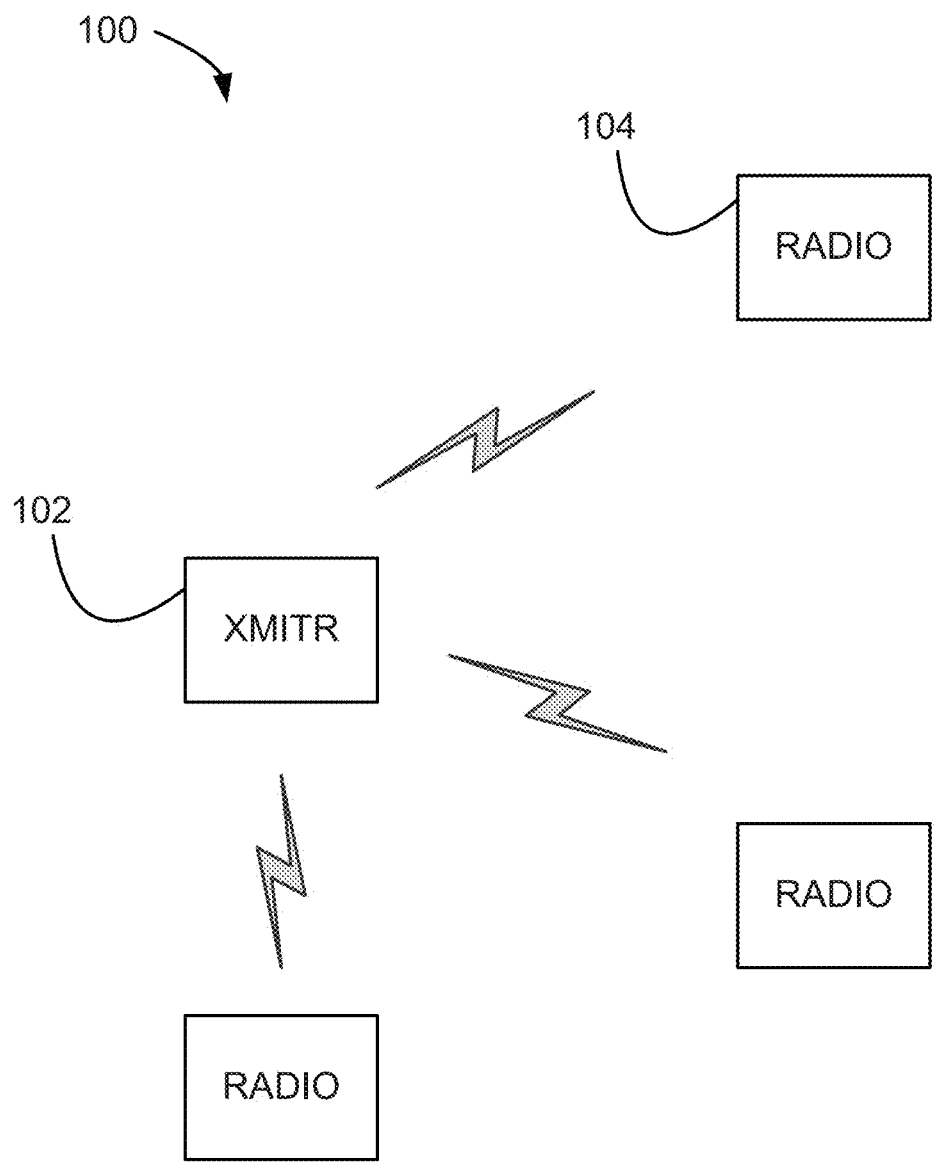
FIG. 1 illustrates an example frequency agile radio network, consistent with an example embodiment of the invention.
Figure 2:
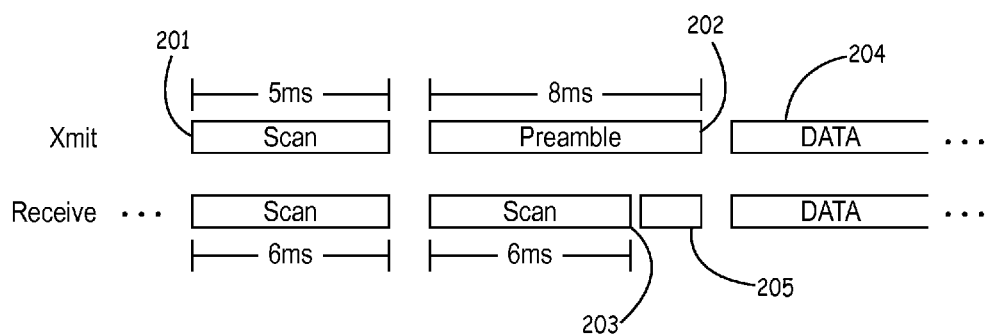
FIG. 2 is a flowchart illustrating listen-before-talk and frequency switching in a radio in conjunction with a long preamble and scanning mechanism, consistent with an example embodiment of the invention.

FIG. 1 illustrates an example frequency agile radio network 100, consistent with an example embodiment of the invention. Here, a radio 102 communicates wirelessly with one or more radios 104. Radio 102 may be coupled, for example, to a control system, such as to manage security in a facility, to monitor utility usage in a facility, or for another such function. In another example embodiment, radio 102 is a controller operable to communicate with ground moisture sensors and sprinkler system actuators including radios 104.

As noted above, the preamble pattern in "scanning" radios is used to detect that a transmission is starting. When a receiving radio detects the preamble pattern, it tracks it ("locks on to it") while it repeats, and then proceeds to read in the packet. The preamble pattern is different for each channel, and the hopping pattern differs on radios like the Digi XTend®, XStream®, and XCite®, for example.

The radios in this example embodiment operate on the 868 MHz band, and employ listen-before-talk to avoid the European duty cycle limitations imposed on radios in this band that do not employ listen-before-talk. The radios are also frequency agile, in that they are operable to change from one frequency to another for reasons such as to avoid interference, and to avoid interfering with other radios or consuming excessive resources on a given frequency or channel. Such a system is described in U.S. patent application Ser. No. 13/175,436, entitled "Listen Before Talk Frequency Agile Radio Synchronization," the description of which is incorporated herein by reference.

Employing listen-before-talk and frequency switching in the same radio is addressed in some embodiments of the invention in conjunction with a long preamble and scanning mechanism. A transmitter 102 wishing to establish communication with one or more receivers 104 begins by scanning available channels at 201 for a free channel that it can use for transmission, evaluating eligible channels for traffic and noise in various embodiments. In a one embodiment, transmitter 102 scans multiple channels at a time, and monitors each channel for a given period (such as five milliseconds) to ensure that the channel is clear and to establish a noise level on the channel.

When a channel has been determined to be available and has a suitably low noise level for communication, the transmitter sends a preamble, as shown at 202. Although the preamble here is shown to be 8 milliseconds in time, a variety of other preamble formats and lengths will be suitable for alternate embodiments of the invention.

Meanwhile, receiver 104 is constantly scanning the available channels or frequency bands, which in this 868 MHz example includes scanning each of 34 available channels during a 6 millisecond period as shown at 203. Because the preamble is transmitted for longer than the amount of time needed for the receiver to scan each channel and read data encoded in the preamble identifying the transmitter or the network, the receiver can join the network or link to the transmitter during a single transmission of the preamble and be ready to receive data at the conclusion of the preamble as shown at 204.

Once the receiver has found the transmitter as a result of repeatedly scanning the channel space of the radios, the scanning stops as shown at 203, the remaining portion of the preamble is received at 205, and data is exchanged as shown at 204. Eventually the data link between the transmitter and receiver is dropped, such as at the conclusion of the transmitter's message, and the receiver will resume scanning each available channel for another transmission as shown at 203. Other embodiments include alternate or additional features, such as a message acknowledgment from the receiver to the transmitter at the conclusion of the data.

To implement directed addressing to a particular radio, the ability is needed to have a lot more preamble patterns than currently used. (Currently XTend® has 52 10-bit "Manchester" patterns). Further, the patterns need to be self synchronizing and they need to have some sort of consistency, such that a radio can quickly detect the pattern is invalid, and switch to the next channel.

Figure 3:
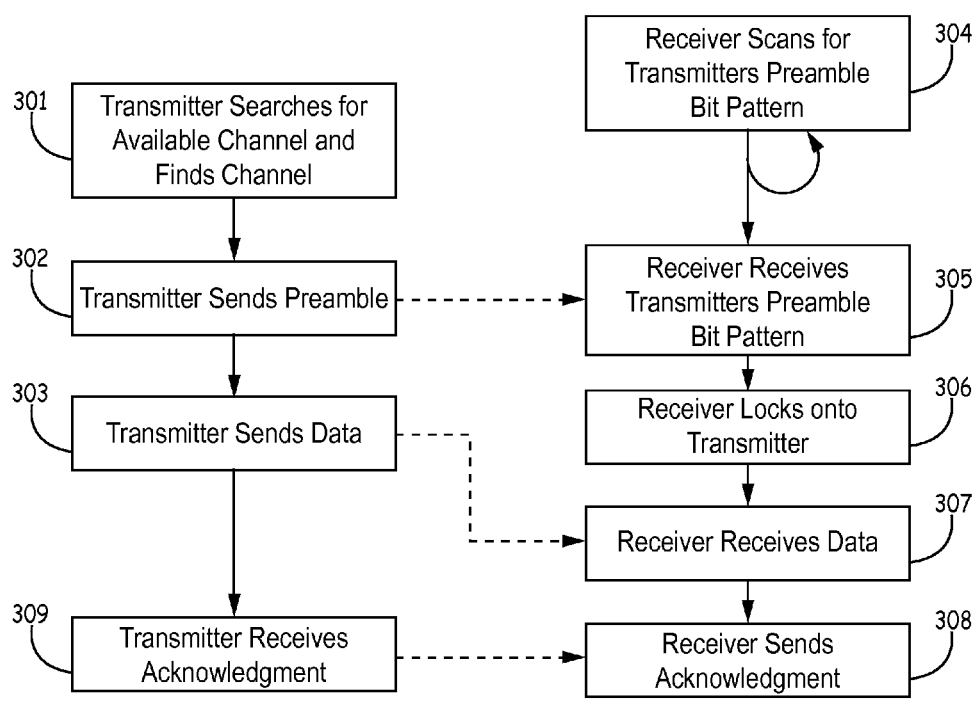
FIG. 3 shows a flowchart of a method of operating a frequency agile radio using listen-before-talk, consistent with an example embodiment of the invention.

FIG. 3 shows a flowchart of a method of operating a frequency agile radio using listen-before-talk, consistent with an example embodiment of the invention. Here, the transmitter operation is shown on the left side of the illustration, and the receiver operation is shown on the right side. The transmitter first searches for an available channel and finds a channel that is both free and has a suitably low noise or interference level at 301. Once a channel is selected, the transmitter sends a preamble at 302. In one embodiment, the preamble is at least slightly longer in time than the time it takes the receiver to scan all available channels on which the transmitter may be operating. This time is, in some embodiments, a relatively short time, such as under 20 ms, 10 ms, 5 ms, or 1 ms. The transmitter then sends the data, as shown at 303. The preamble in another example identifies the intended receiver, by incorporating information marking the message as intended for the receiver or as a broadcast message. In further embodiments, the transmitter receives confirmation from the receiver that the data has been successfully received before transmitting further data, to ensure reliable communication between the transmitter and the receiver.

The receiver scans for a transmitter's preamble pattern at 304, in some embodiments limited to only a recognized preamble pattern of a specific receiver such as the receiver's unicast and broadcast preambles that are a part of a specific radio network or of a specific radio device. The scanning continues until the receiver finds the transmission being searched for, by receiving the transmitter's recognized preamble bit pattern at 305. As shown by the dashed lines, this happens as a result of the transmitter selecting a channel and transmitting the preamble as shown at 302.

The receiver then locks on to the channel or frequency band on which the preamble was found at 306, and receives data at 307. Eventually, the transmitter will have sent its message and will send an acknowledgment at 308, which is received by the transmitter at 309, and the method illustrated will start over again. In still other embodiments, the transmitter changes frequency after a fixed amount of time, when interference or other traffic is detected on the chosen band, based on a pseudorandom schedule, or through another triggering mechanism, resulting in the method illustrated in FIG. 3 starting over again with the transmitter seeking a new channel at 301.

Rapid scanning of the available channels such that the receiver can scan each channel or frequency band for the preamble during the time the preamble is being sent from the transmitter provides for rapid recognition of the transmitter's new frequency without needing to explicitly communicate or coordinate the new frequency between the receiver and transmitter before the frequency is changed. The receiver in some embodiments scans each channel, and upon finding a signal on a channel evaluates the signal rapidly to determine whether data found on the channel is a preamble identifying a desired receiver or radio network.

The receiver will also desirably be able to recognize that received bits are not a part of the desired preamble quickly, so that the scanning process may proceed to the next channel. Further, the amount of computation needed to make this determination is desirably low, so that processing overhead or delay is minimized in finding and locking on to a channel carrying a transmission of the desired preamble pattern.

In one embodiment, transmitter 102 transmits a preamble that includes information used by the receiver to determine more quickly whether the underlying data packet is intended for the receiver. In one such embodiment, the MAC address of the receiver is encoded in the preamble. Such an approach is, however, not practical in all applications. It would increase the scanning time, and increase the number of bits to be processed in software on the RX radio. In a particular application, there is a theoretical ideal for the number of nodes that can be encoded in the preamble pattern. In the 868 embodiment described above, 4 bits of address information is encoded in the preamble. In one such embodiment, the bottom 4 bits of the MAC address is used achieve a more random distribution.

In one approach, Manchester encoding is used to provide a DC balanced signal. Other none-return-to-zero (NRZ) preambles can be used as well since with newer radio hardware there is less dependency on DC balanced data. In one embodiment, the preamble patterns are selected to be self-synchronizing and are designed to have some sort of consistency, such that a radio 104 can quickly detect that the pattern is invalid, and switch to the next channel. By creating a pattern of an odd number of bits, and by fanning the bits out in pairs, between fixed bits, one can create a self synchronizing pattern that has a maximum run length of 3 bits.

An advantage is that the pattern is NRZ-based and that it does not have to have a DC balance of zero, although by proper selection, the DC balance can be close to zero.

I discovered a class of patterns that are self synchronizing, have a maximum run length of 3 bits, and can be tailored to create patterns of various lengths. For the 868 example above, the specific length selected is 19 bits.

These patterns have reasonable DC balance characteristics to start with. Because the pattern always starts with 5 bits, and the rest of the pattern is an even number of bits, the DC balance is never zero. The basic form of the patterns is:

010 01 xx 01 xx 01 xx 01 xx . . .
101 10 xx 10 xx 10 xx 10 xx . . .

This pair of patterns is termed an orthogonal pair. The pattern is designed such that the first 5 bits cannot occur in the rest of the pattern, no matter what values are given for the x's. This makes this class of patterns self synchronizing. In addition, the maximum run length is 3 bits.

The desired patterns may be an arbitrary odd length. By examining the first 5 bits, one can create all patterns that have a maximum run length of 3 bits. From these patterns one can eliminate all patterns that are shifted versions of the other patterns.

In one embodiment, we selected specific patterns based on the DC characteristics to keep the DC balance close to zero. On one approach, a list is made of all 19 bit preamble patterns that are unique (not a shifted variation of another pattern). The patterns were then sorted based on the best DC balance. The result is a system and method of encoding data on a preamble pattern.

In one such embodiment, the patterns having the best DC patterns are sorted into orthogonal pairs. Rotated versions of the top patterns are then reviewed to see if shifting causes problems.

Typically, as noted above, in frequency agile radio networks, all the receiving radios lock into receiving a packet being transmitted, even though the packet may ultimately not be addressed to that radio. This has the effect that a radio may miss a packet that was directed for it, when another packet addressed to it is transmitted on another channel, if it finds a preamble pattern first. In a mesh environment this can be a significant source of retries.

Once you have a method of encoding data on a preamble pattern, it becomes possible to encode address information such that the receiving radio can quickly determine if a particular data packet is of interest. In one approach, one or more address bits replace the x's in the preamble patterns.

In another approach, one can associate certain MAC addresses with particular preamble patterns. By creating unique preamble patterns and associating these patterns with MAC addresses of radios, one can make it much less likely that the receiver will lock into a packet that is not addressed to it.

In one embodiment, a preamble pattern is formed by combining the channel number with the hopping pattern, and with part of the MAC address. In one such embodiment, only the bottom four bits of MAC address are used in the preamble pattern, but other numbers of bits and other bit locations could be used as well.

In one embodiment, the result is 512 possible patterns to choose from. In one such embodiment, patterns are selected that have the following first 5 bits:

00101 01001 01101 10010 10110 11010 00011 00111

In one such embodiment, the orthogonal version of each pattern is used as well.

In one embodiment, transmitter 102 transmits on up to 34 channels. One can compute a pseudo channel from the actual channel by adding in the hopping pattern *3:

```
// add in the hop table *3 and wrap it.
channel += (hopTbl*3);
// make sure we stay within the NRZ table range from the previous calculation.
    while (channel >= NRZ_PREAMBLE_CHANNELS) {
        channel -= NRZ_PREAMBLE_CHANNELS;
    }
```

This gives us a block of patterns to use. Then within the block, one has 16 patterns (8 with orthogonal pairs) that can be used if the packet is destined to a specific radio, and one to two others (one orthogonal pair) for broadcasts.

In one example embodiment of the 868 system described above, transmitter 102 uses the bottom four bits of the MAC address, which are mapped to 16 preamble patterns per channel. When transmitting radio 102 prepares to send a packet it uses the destination MAC address to map to the appropriate preamble pattern for that channel.

By directing packets to radios in a hopping or frequency agile network, such that they don't lock into packets that are not destined to them and instead are more likely to be available to receive the packets intended for them, the network becomes more reliable, and more scalable. In addition, by reducing retries such a network consumes less power and creates less RF congestion. Such an approach also can take advantage of the multi-channel capability of hopping radios, where multiple transmissions can occur at once to different receivers on different channels.

FIG. 4 shows a method of evaluating received data to determine if it is the preamble of a desired receiver or network, consistent with an example embodiment of the invention. In this example, the receiver is scanning for two different preamble patterns, including one preamble pattern identifying the receiver as the intended recipient and another identifying that the transmitter is broadcasting a message within the radio network.

The preamble in this example comprises a 19-bit pattern, repeated 38 times over the course of the preamble transmission. The 19-bit preamble comprises 8 bits of data embedded in a longer pattern designed to limit the number of sequential bits having the same data element to three bits, similar in concept to Manchester coding but in this example allowing a run length of three sequential same bits.

Looking at the example 19-bit preamble at 401, eight bits of data can be encoded in the bit positions marked by an "x", while the remaining bits are fixed and ensure at most a run length of three sequential bits that are the same. The example preamble pattern given here is also configured such that the first five bits of the preamble cannot occur as a pattern later within the preamble, enabling the receiver to easily determine when a 19-bit preamble sequence starts and ends.

A second preamble example is shown at 402, which similar to preamble 401 can encode eight bits of data such as channel information within the preamble in bit positions marked with an "x", and will have at the most three sequential bits of data that have the same value. The second preamble 402 is also configured such that the first five bits cannot occur anywhere within the 19-bit sequence other than in the first five bits, and are further configured that these first five bits cannot occur anywhere within the other preamble shown at 401. In further embodiments, as noted above, a greater number of preambles that are orthogonal to one another are used, such as to identify the intended receiver.

Use of preamble patterns such as those shown at 401 and 402 enable the receiver to rapidly determine whether the received data is part of a valid preamble, as the receiver can reject signals that don't contain valid preambles based on bit timing, an observed sequence having more than three bits of the same value, or that lack a predetermined combination of bits such as those not marked with an "x" in the example preambles shown at 401 and 402.

In a further example, bit patterns such as those shown at 401 and 402 are selected to maximize bit transitions, such as to not have more than three consecutive bits of the same value in the first five bits of the preamble pattern. This allows the receiver to more rapidly and accurately recover clock or timing information from the bit stream, and more quickly evaluate a received signal.

In a more detailed example, the receiving radio is scanning available channels and looking for one of two preambles, such as those at 401 and 402. One preamble is identified as a broadcast message, and the other preamble as being addressed to the receiver. The receiver is able to quickly and accurately identify an incoming preamble by looking for one of the two bit sequences shown at 401 and 402 in a series of received bits, and moving on to the next channel if a signal does not contain a desired preamble.

Evaluating the received bits in the receiver is performed in a more detailed example by copying each of the two 19-bit preambles into a table 19 times, bit shifted by one bit for each table entry, as shown at 403. The resulting table of 38 entries can then be directly compared against an incoming bit stream, such that as soon as the incoming bits do not match at least one of the table entries it is known that the incoming signal does not contain a desired preamble. The table in a further example is sorted, so that only a portion of the table matching the previous received bits need be scanned for newly received bits.

Because there are only 38 table entries, the first six or seven bits of received data can exclude most typical received signals not containing a desired preamble from further evaluation, such that the receiver can move on to the next channel and continue the search for a transmitter. Each additional bit received that matches a preamble table entry improves the odds that a valid preamble is being received, such that very few invalid bit sequences will be evaluated past ten bits, allowing the radio to progress to scanning the next channel before an entire 19-bit sequence is received.

The scanning process can further use the position of the first five bits of the preamble in a received bitstream to synchronize the receiver to the beginning of a word of data, knowing that the preamble is 19 bits long and starts with a five bit pattern that is not repeated in any other valid preamble.

Comparison is implemented in some embodiments using hardware or software methods such as combinational logic or a programmed processor, such as a 32-bit processor. In one such 32-bit processor embodiment, the 19-bit preambles are buffered with zeros to fill 32-bit words for comparison, along with masking bit positions of bits not yet received or not known in both the lookup table and received data to ensure that matches are based only on the bits received and known to be a part of the preamble. Extra bits may simply be filled with zeros in a more detailed embodiment, while data in bit positions marked with an x in the examples at 401 and 402 may be similarly replaced with zeros, or otherwise masked from comparison as the values of the data received in these bit positions may not be known. As additional bits are received, only table entries matching previous comparisons need be evaluated, reducing the amount of time needed to evaluate the received data against the table of preamble bit patterns. A variety of other lookup and matching methods are also suitable, and are within the scope of various embodiments of the invention.

The examples presented here illustrate how information can be encoded in a preamble and then used to convey address information to receivers on a frequency agile radio. Although specific embodiments have been illustrated and described herein, it will be appreciated by those of ordinary skill in the art that any arrangement which is calculated to achieve the same purpose may be substituted for the specific embodiments shown. The invention may be implemented in various modules and in hardware, software, and various combinations thereof, and any combination of the features described in the examples presented herein is explicitly contemplated as an additional example embodiment. This application is intended to cover any adaptations or variations of the example embodiments of the invention described herein. It is intended that this invention be limited only by the claims, and the full scope of equivalents thereof.

What is claimed is:

1. In a frequency agile radio network, a method of encoding data into a preamble pattern, comprising:
    creating a plurality of preamble patterns, wherein each preamble pattern includes an N bit header and an M bit body, wherein N and M are integers greater than two; and
    identifying the preamble patterns that have headers with a bit pattern that cannot occur in the body, wherein the preamble has a run length no greater than P bits, wherein P is an integer greater than one; and
    transmitting at least one of the identified preamble patterns repeatedly during a preamble transmission from a transmitter in the frequency agile radio network.

2. The method of claim 1, wherein N is five and M is an even number.

3. The method of claim 1, wherein N is five and M is an even number and wherein the M bit body includes two bits of data followed by the first two bits of the N bit header.

4. The method of claim 1, wherein N is five and M is an even number and wherein the M bit body includes two bits of data followed by the first two bits of the N bit header, followed by two bits of data followed by the next two bits of the N bit header.

5. The method of claim 1, wherein identifying preamble patterns includes associating a particular header with a particular set of receivers.

6. The method of claim 1, wherein creating includes selecting, from a plurality of preamble patterns, those that give good DC balance.

7. The method of claim 1, wherein creating includes selecting, from a plurality of preamble patterns, those that can be used to encode data.

8. The method of claim 1, wherein creating includes selecting, from a plurality of preamble patterns, those that can be used to encode address information.

9. A method of transmitting data from a frequency agile transmitter to a frequency agile receiver, comprising:
    listening, at the receiver, for a preamble having a header and a body, wherein the header has a bit pattern that cannot occur in the body, wherein the preamble has a run length no greater than P bits, wherein P is an integer greater than one, wherein listening includes scanning each of a plurality of channels, wherein the plurality of channels includes a first channel;
    transmitting, on the first channel, a message having a preamble and message data, wherein the preamble includes a header and a body, wherein the header has a bit pattern that cannot occur in the body, wherein the preamble has a run length no greater than P bits, wherein P is an integer greater than one, and wherein the preamble is selected to be longer than the time needed by the receiver to scan across each of the plurality of channels;

detecting, at the receiver, the message transmitted on the first channel;

determining, from the preamble, whether the message is intended for the receiver;

if the preamble indicates that the message is intended for the receiver, storing the message data; and if the preamble indicates that the message is not intended for the receiver, ignoring the message.

10. The method of claim 9, wherein determining includes determining whether the preamble fits a preamble pattern associated with the receiver.

11. The method of claim 9, wherein transmitting includes selecting the preamble to be transmitted from one or more orthogonal pairs of preamble patterns, and wherein determining includes determining, at the receiver, whether the preamble matches the selected preamble pattern.

12. The method of claim 9, wherein the receiver is configured to accept messages with a first preamble pattern;
wherein transmitting includes determining if the message is intended for the receiver and, if the message is intended for the receiver, selecting a preamble with the first preamble pattern; and
wherein determining includes determining, at the receiver, whether the preamble has the first preamble pattern.

13. The method of claim 12, wherein the preamble is selected from a preamble pattern that includes an N bit header and an M bit body, wherein N and M are integers greater than two.

14. The method of claim 12, wherein two of the preamble patterns form an orthogonal pair and wherein determining, from the preamble, whether the message is intended for the receiver includes determining from the header of the preamble whether the message is intended for the receiver.

15. In a frequency agile radio network, a method of directing a packet to a specific radio receiver within a plurality of receivers, including a first and second radio receiver, wherein each radio receiver includes an address having a plurality of address bits, the method comprising:
creating a plurality of preamble patterns, wherein each preamble pattern includes an N bit header and an M bit body, wherein N and M are integers greater than two;
identifying preamble patterns from the plurality of preamble patterns that have a header and a body, wherein the body includes data bits that can be used to encode data and wherein the headers have a bit pattern that cannot occur in the body, wherein the preamble pattern has a run length no greater than P bits, wherein P is an integer greater than one;
associating a first header from one of the preamble patterns with the first and second radio receivers, wherein associating includes instructing the first and second radio receivers to respond to accept messages with the first header;
receiving, at the first receiver, a message including one of the plurality of preamble patterns;
determining if the preamble pattern includes the first header;
if the preamble pattern includes the first header, determining if the preamble pattern includes address bits associated with the first radio receiver;
if the preamble pattern includes the first header and if the preamble pattern includes, encoded within the data bits, address bits associated with the first radio receiver, receiving the message;
if the preamble pattern does not include the first header, ignoring the message; and
if the preamble pattern does not include, encoded within the data bits, address bits associated with the first radio receiver, ignoring the message.

16. The method of claim 15, wherein associating a first header with the first and second radio receivers includes configuring the first and second radio receivers to look for a particular header in the preamble.

* * * * *